United States Patent [19]
Denz et al.

[11] Patent Number: 5,775,106
[45] Date of Patent: Jul. 7, 1998

[54] DEVICE FOR LOAD DETECTION IN AN INTERNAL COMBUSTION ENGINE WITH TURBO CHARGER

[75] Inventors: Helmut Denz, Stuttgart; Klaus Böttcher, Oberriexingen, both of Germany

[73] Assignee: Robert Bosch GmbH, Stuttgart, Germany

[21] Appl. No.: 682,696

[22] PCT Filed: Nov. 30, 1995

[86] PCT No.: PCT/DE95/01688

§ 371 Date: Jul. 26, 1996

§ 102(e) Date: Jul. 26, 1996

[87] PCT Pub. No.: WO96/21100

PCT Pub. Date: Jul. 11, 1996

[30] Foreign Application Priority Data

Dec. 31, 1994 [DE] Germany ............... 44 47 304.4
Mar. 10, 1995 [DE] Germany ............... 195 08 641.4

[51] Int. Cl.$^6$ .................................................. F02D 41/18
[52] U.S. Cl. ......................................... 60/605.1; 123/480
[58] Field of Search ........................ 60/600, 601, 602, 60/603, 605.1; 123/488, 559.1, 480

[56] References Cited

U.S. PATENT DOCUMENTS

| | | | |
|---|---|---|---|
| 4,928,489 | 5/1990 | Inoue et al. | 60/602 |
| 4,986,244 | 1/1991 | Kobayashi et al. | 123/488 |

FOREIGN PATENT DOCUMENTS

| | | |
|---|---|---|
| 291953 | 11/1988 | European Pat. Off. |
| 323754 | 7/1989 | European Pat. Off. |
| 339638 | 11/1989 | European Pat. Off. |
| 404392 | 12/1990 | European Pat. Off. |
| 2514825 | 4/1983 | France . |
| 4322281 | 5/1993 | Germany . |
| 4322281 | 1/1995 | Germany . |

*Primary Examiner*—Michael Koczo
*Attorney, Agent, or Firm*—Michael Striker

[57] ABSTRACT

A device for load determination in an internal combustion engine with a turbo engine is described, wherein the auxiliary load signal determined from the throttle flap angle and the rpm is subjected to a compression compensation, wherein this compression compensation is performed in different operational ranges of the internal combustion engine with a turbocharger in different ways, wherein factors are respectively defined which are multiplied by the uncorrected auxiliary load signal.

7 Claims, 1 Drawing Sheet

DEVICE FOR LOAD DETECTION IN AN INTERNAL COMBUSTION ENGINE WITH TURBO CHARGER

BACKGROUND OF THE INVENTION

The invention relates to a device for load detection in an internal combustion engine with a turbocharger.

The load on an internal combustion engine is a value of very great importance in connection with the regulation of the internal combustion engine. It is therefore customary to detect the load with the aid of a sensor, for example an airflow meter, and to perform a further load detection in addition. The signal provided by the load sensor is here customarily identified as the main signal. The signal detected in another way is the so-called auxiliary load signal. It is calculated, for example, from the throttle flap angle, which is measured anyway, and the rpm of the internal combustion engine, also continuously detected. So that an exact regulation of the internal combustion engine is possible, the auxiliary load signal must be subjected to a compression compensation.

Such a compression compensation of the auxiliary load signal by means of temperature and/or pressure or altitude compensation for internal combustion engines without a turbo-charger is already known from DE-P 43 22 281. However, additional requirements arise in connection with internal combustion engines with turbochargers, for which the auxiliary load detection being performed in conventional internal combustion engines is insufficient.

SUMMARY OF THE INVENTION

The device in accordance with the invention has the advantage that an especially reliable load detection in connection with an internal combustion engine with a turbocharger is possible. In this case it is particularly advantageous that the auxiliary load detection can be adapted to various turbo-specific conditions. These advantages are attained in that, depending on the detected condition, the auxiliary load signal is calculated in accordance with different algorithms, taking into consideration various correction factors. Thus, when calculating the auxiliary load signal, a differentiation is made whether the internal combustion engine operates within an operation range comparable to a naturally aspirated engine, whether a boost range has been achieved by means of controlled operation, or whether a boost range with airflow or boost-pressure regulation is present.

A further advantage is to be seen in that values which are present anyway are used for determining the corrected auxiliary load signal. It is furthermore advantageous that all calculations can be performed in the already present control device of the internal combustion engine. Since an auxiliary load signal is obtained, which is especially accurate and is optimally adapted to the actual conditions, it is possible on the basis of this auxiliary load signal for an emergency operation of the internal combustion engine to take place when the main load sensor is defective, or if an error of any kind occurs in the main load signal detection.

BRIEF DESCRIPTION OF THE DRAWINGS

An exemplary embodiment of the invention is represented in the single drawing figure and will be explained in detail in the subsequent description.

DESCRIPTION OF THE PREFERRED EMBODIMENT

Figure 1:
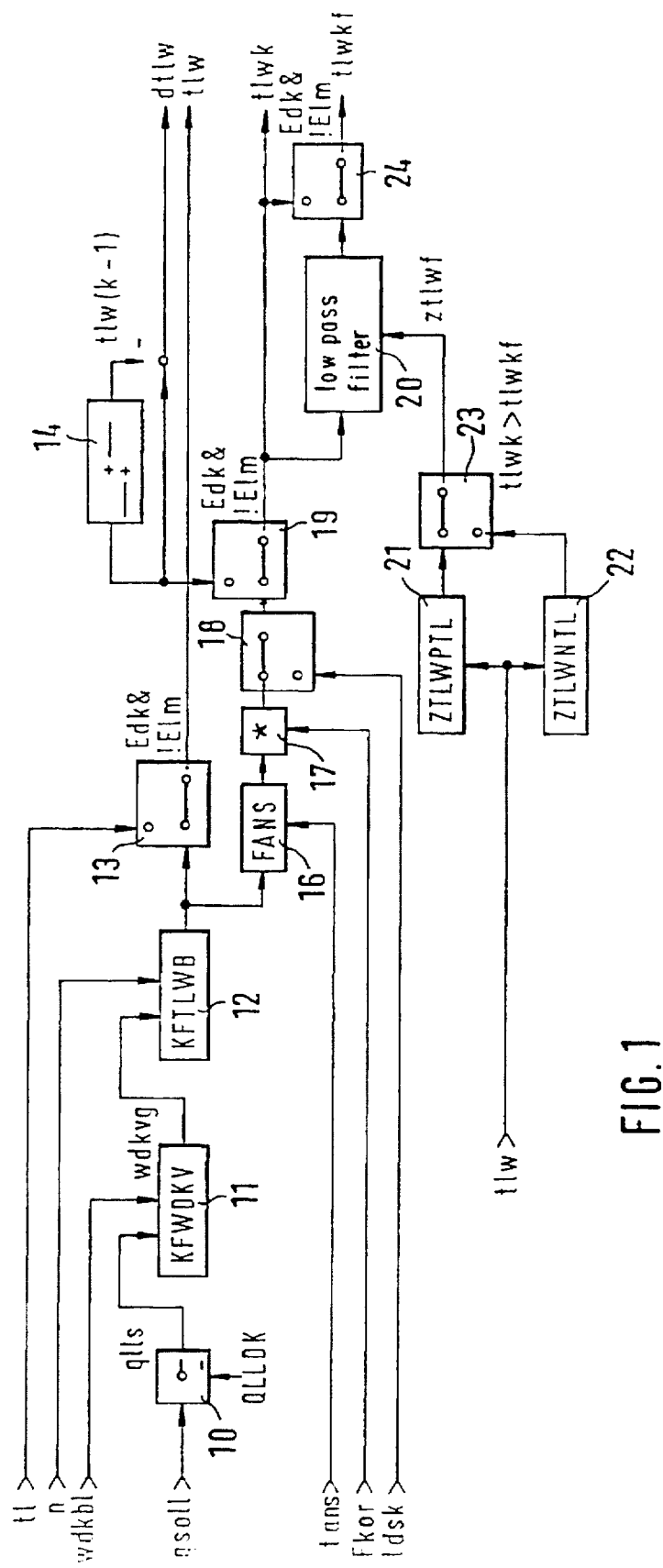

A flow diagram is represented in the drawing figure, from which it can be seen how the corrected auxiliary load signal is formed, taking into consideration various initial values, in connection with an engine with a turbocharger. This determination customarily is performed in the control device of the internal combustion engine. Since internal combustion engines with turbochargers and including the associated sensors have already been described in other references, for example in DE-P 42 19 791, such a description will be omitted here.

The corrected auxiliary load signal tlwk is calculated in the control device from the values of main load signal tl, rpm n, throttle flap angle as a function of the idle angle wdkbl, amount of airflow qsoll through the bypass, temperature of the aspirated air tans, factor for the throttle flap height adaptation FKor and the corrected boost pressure set value ldsk, which are measured or calculated in a known manner.

In particular, for forming the value qlls, which represents the actual amount of airflow through the bypass setting device, in block 10 the airflow through the closed throttle flap (leak air) OLLDK is subtracted from the detected amount of airflow qsoll through the bypass.

This amount of airflow through the setting device qlls, together with the throttle flap angle wdkbl related to idling and the characteristic diagram KFWDKV for the virtual throttle flap angle from the bypass correction, is used in block 11 for the total virtual throttle flap angle wdkvg.

A suitable value is formed in block 12 from the auxiliary load characteristic diagram consisting of the throttle flap angle including the bypass correction for the calculated total virtual throttle flap angle wdkvg and the measured rpm n of the internal combustion engine, which represents the not yet compressioncorrected auxiliary load signal tlw. The application of the tlw characteristic diagram (KFTLWB) takes place in controlled operation.

Error detection is performed in block 13. A check is made in the course of this whether there is an error in the throttle flap sensor and a check is made whether an error of the main load sensor was detected. Depending on the outcome, a switchover is performed in block 13 and either the auxiliary load signal tlw obtained at the output of block 12 is passed on, or the main load signal tl is passed on as the auxiliary load signal tlw.

A further signal, Delta load signal throttle flap dtlw, can be formed from the auxiliary load signal present at the output of block 13, in that the auxiliary load signal in block 14 is compared with a threshold value and the output signal tlw(k-1) obtained in this way is compared with the load signal tlw.

The compression-corrected signal tlwk results from the multiplication of the auxiliary load signal tlw with the aspiration air correction factor FANS (block 16) and the altitude correction factor FKor (block 17). Whether this signal or the corrected boost pressure regulation set value ldsk is used as the auxiliary load value depends on the conditions which are checked in block 18. A check is made in block 18 whether the condition boost pressure regulation active is valid or the condition for an Ldr-control is active, wherein a switchover takes place depending on the actual conditions.

A check is again made in block 19 whether there is an error in the throttle flap sensor and an error in the main load sensor. Depending thereon, the corrected auxiliary load signal tlwk is passed on.

The corrected auxiliary load signal tlwk is filtered with the time constant ztlwf in the low pass filter 20 for the adaptation to the aspiration tube pressure and thus to the charge. In this case the filter time constant is merely a function of the load, in particular in connection with a crankshaft-synchronous calculation of the filter. It is different for positive and negative load changes. The filter time constant ztlwf is selected either as a falling (negative) time constant or a rising (positive) time constant, wherein these two time constants are stored as characteristic curves in blocks 21 or 22. The switchover takes place in block 23, wherein the switching state of the block 23 is a function of the condition tlwk>tlwkf. Access to the characteristic curves takes place as a function of the actual auxiliary load signal tlw.

The filtered auxiliary load signal tlwkf appears at the output of the low pass filter 20 and is used for regulating the internal combustion engine, provided the conditions of an error at the throttle flap sensor and an error at the main load sensor, which are interrogated in block 24, are not met.

The adapted auxiliary load signal is determined in accordance with the flow diagram represented in the drawing figure, wherein the different conditions in connection with an internal combustion engine with a turbocharger are taken into consideration.

If the auxiliary load signal tlw for aspirating or turbo engines is determined in the same manner as known from DE-P 43 22 281, the calculation of the corrected auxiliary load signal tlwk takes place in accordance with the equation:

$$tlwk = tlw \cdot Fans \cdot fdkha$$

The factors Fans and fdkha are correction factors for the aspiration air temperature compensation as well as an altitude factor from the altitude adaptation. The multiplicative correction from the two factors (Fans·fdkha) corresponds to the compression compensation of the auxiliary load signal by means of a temperature and pressure or altitude compensation.

In accordance with the invention, a differentiation is now made in connection with an internal combustion engine with a turbocharger as to which operational condition is present. In the operational range comparable with a naturally aspirated engine (at a low boost rate) with a turbocharger operating at a low load, dependencies comparable with a naturally aspirated engine result, i.e. the air density enters the aspirated airmass correspondingly.

However, in connection with a turbo engine with airflow regulation there is no dependence of the aspirated airflow on the air density in the boost regulating range, since regulation to a predetermined airflow is performed. Only the effects of temperature remain with engines with boost pressure regulation.

Although a dependence on the compression results in the boost range without regulation, it is not in the same amount than in the pure aspiration range. Accordingly, the following calculation possibility for the auxiliary load signal results for a turbo engine with airflow or boost pressure regulation:

a) Pure aspiration range:

$$tlwk = tlw \cdot Fans \cdot Fkor.$$

In this case the factor Fkor corresponds to the factor fdkha, i.e. the altitude factor from the altitude adaptation.

b) Boost range with airflow or boost pressure regulation:

$$tlwk = tlw \cdot Fans \cdot 1.$$

In this case the factor Fans is the correction factor for the aspiration air temperature compensation in case of boost pressure regulation. With airflow regulation the factor Fans= 1.

In connection with engines with airflow regulation it is possible in the regulating range to alternatively switch over to the pre-control characteristic diagram for the airflow regulation. In this case the corrected auxiliary load signal, as shown in the drawing figure, is calculated in accordance with the equation:

$$tlwk = ldsk.$$

Here, ldsk is the corrected load set signal for airflow regulation. The switchover to this value takes place after the throttle flap has exceeded a defined threshold value. This threshold value is DKldr, this is the throttle flap threshold after which a purely regulated operation is performed. In this throttle flap range the tlw characteristic is applied to the controlled operation. With this, a correspondingly lower and more correct auxiliary load signal is obtained during emergency operation.

c) Boost range with controlled operation:

$$tlwk = tlw \cdot Fans \cdot Fkor$$

Again, the factor Fans is the correction factor for the aspiration air temperature compensation, and the factor Fkor is a correction factor. It is formed in accordance with the equation:

$$Fkor = fdkha + (DKist - DKsb) \cdot (1 - fdkha)/(DKldr - DKeb)$$

In this case DKist means the actual throttle flap position, DKsb is the upper throttle flap threshold up to which a pure aspiration operation (range a) is provided, DKldr is the lower throttle flap threshold, after which a pure regulated operation (range b) is present.

The throttle flap thresholds mentioned can be stored as characteristics curves as a function of the rpm, for example. Furthermore, the dependence of at least the DKsb characteristic curve from a defined height should be provided.

The calculation of the auxiliary load signal in connection with internal combustion engines with turbochargers taking place in various operational ranges based on different equations makes it possible for a charge-correct auxiliary load signal to be always available. By means of this improved auxiliary load signal it is possible in case of an error in the main load signal or the associated evaluation range to perform a regulation of the internal combustion engine exclusively with the aid of the auxiliary load signal. In this way it is possible to perform a still dependable emergency operation.

The claim:

1. A device for load detection in an internal combustion engine, wherein an airflow meter delivers a first load signal, and a second load signal is formed as a function of a throttle flap position and the rpm of the internal combustion engine and the second load signal is subjected to a compression compensation by the multiplication of the second load signal with at least one factor selected from the group consisting of a temperature dependent-factor and a pressure-dependent factor, characterized in that the internal combustion engine has a turbocharger, that several different operational states of the internal combustion engine are defined and the determination of the corrected second load signal from the uncorrected one takes place at different conditions in accordance with different algorithms, a differentiation between three operational ranges is made, wherein the first operational range is an operational range comparable to a naturally aspirated engine, the second operational range is a boost range with regulation selected from the group consisting of airflow regulation and boost pressure regulation, and the third range is a boost range with controlled operation.

2. The device for load detection in accordance with claim 1, characterized in that in the pure aspiration range the load is determined in accordance with the equation tlwk= tlw·Fans·Fkor, in the boost range with airflow or boost pressure regulation in accordance with the equation tlwk= tlw·Fans·1, and in the boost range with controlled operation in accordance with the equation tlwk=tlw·Fans·Fkor, wherein the factor (Fans) is a correction factor for the aspiration air temperature compensation, the factor (Fkor) is the altitude factor from the altitude adaptation, and the factors are different in the individual operational ranges.

3. The device for load detection in accordance with claim 1, characterized in that in the boost range with airflow or boost pressure regulation, the corrected second load value can be obtained alternatively from the pre-control characteristic diagram for airflow regulation, wherein tlwk=ldsk applies, and ldsk corresponds to the set value tl from the airflow regulation.

4. The device for load detection in accordance with claim 3, characterized in that in the boost range with controlled operation the factor (Fkor) is determined in accordance with the relationship Fkor=fdkha+(DKist−DKsb)·(1−fdkha)/ (DKldr−DKeb), wherein DKist is the actual throttle flap position, DKsb the upper throttle flap threshold up to which a pure aspiration operation is provided, DKldr is the lower throttle flap threshold, after which pure regulated operation is provided.

5. The device for load detection in accordance with claim 4, characterized in that the throttle flap thresholds are stored as a function of the rpm in the form of characteristic curves.

6. The device for load detection in accordance with claim 1, characterized in that the evaluations are performed in the control device of the internal combustion engine and the required values are detected by means of sensors and supplied to the control device, and the required characteristic curves or characteristic diagrams are stored in memory means of the control device.

7. The device for load detection in accordance with claim 1, characterized in that in case of a detected erroneous function of the airflow meter providing the first load signal an emergency operation is activated and the control and/or regulation of the internal combustion engine with a turbocharger is performed by means of the corrected second load signal.

* * * * *